United States Patent [19]
Boyce et al.

[11] Patent Number: 5,996,768
[45] Date of Patent: *Dec. 7, 1999

[54] QUICK CHANGE DRUM

[75] Inventors: Keith W. Boyce, Philadelphia; Kelly J. Rawley, King of Prussia, both of Pa.

[73] Assignee: R. W. Hartnett Company, Philadelphia, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/787,238

[22] Filed: Jan. 22, 1997

[51] Int. Cl.⁶ ................................................. B65G 17/32
[52] U.S. Cl. .............................. 198/397.01; 198/397.03; 198/397.02; 198/867.11; 198/867.12; 198/867.15
[58] Field of Search ........................ 198/397.01, 397.02, 198/397.03, 397.04, 867.11, 867.12, 867.15, 803.2

[56] References Cited

U.S. PATENT DOCUMENTS

| | | |
|---|---|---|
| 1,385,000 | 7/1921 | Griffing . |
| 2,364,163 | 12/1944 | Pearson ............................. 198/397.04 |
| 2,373,083 | 4/1945 | Brewster ...................................... 85/5 |
| 2,515,807 | 7/1950 | Spooner ....................................... 85/5 |
| 2,859,689 | 11/1958 | Ackley . |
| 2,931,292 | 4/1960 | Ackley . |
| 3,084,781 | 4/1963 | Merrill . |
| 3,085,462 | 4/1963 | Myers ...................................... 411/348 |
| 3,180,390 | 4/1965 | Ockert, Jr. ................................. 151/69 |
| 3,233,496 | 2/1966 | De Pew et al. ............................... 85/5 |
| 3,272,118 | 9/1966 | Ackley . |
| 3,498,653 | 3/1970 | McCreery . |
| 3,670,865 | 6/1972 | Garland . |
| 3,789,575 | 2/1974 | Bross . |
| 3,838,766 | 10/1974 | Wagers, Jr. et al. . |
| 3,889,591 | 6/1975 | Noguchi . |
| 3,933,239 | 1/1976 | Yoshida . |
| 4,126,219 | 11/1978 | Bross . |
| 4,135,418 | 1/1979 | McCray et al. .......................... 85/36 A |
| 4,189,996 | 2/1980 | Ackley, Sr. et al. . |
| 4,308,942 | 1/1982 | Ackley . |
| 4,369,702 | 1/1983 | Ackley . |
| 4,377,971 | 3/1983 | Ackley . |
| 4,413,556 | 11/1983 | Ackley . |
| 4,483,639 | 11/1984 | McCandless, II ....................... 403/317 |
| 4,632,028 | 12/1986 | Ackley . |
| 4,657,130 | 4/1987 | Ackley, Jr. et al. . |
| 4,905,589 | 3/1990 | Ackley . |
| 4,932,295 | 6/1990 | Erickson . |
| 5,261,522 | 11/1993 | Guttinger et al. ...................... 198/429 |
| 5,433,146 | 7/1995 | Ackley . |
| 5,494,323 | 2/1996 | Huang .................................... 292/252 |

OTHER PUBLICATIONS

"Ball Lock™ Shanks and Repairs Kits" catalog page, (undated).

Primary Examiner—Robert P. Olszewski
Assistant Examiner—Steven B. McAllister
Attorney, Agent, or Firm—Synnestvedt & Lechner LLP

[57] ABSTRACT

A quick change drum for receiving and orienting pellet-like items in a pellet marking machine is disclosed. The quick change drum comprises a central shaft with two end plates perpendicularly attached to the ends of the shaft in parallel spaced apart relationship. A multiplicity of carrier bars are demountably attached to the end plates and span the space between the end plates forming a substantially continuous cylindrical surface. Each carrier bar has at least one concavity, preferably a multiplicity of concavities, disposed in its outwardly facing surface, the concavity or concavities being matched to a particular pellet-like item size and shape. The carrier bars are demountably attached to the end plates, preferably by bolts, but may also be attached by means of quick connect/disconnect devices which allow more rapid and efficient replacement of the carrier bars.

35 Claims, 6 Drawing Sheets

QUICK CHANGE DRUM

FIELD OF THE INVENTION

This invention relates to rotating drums used to receive, orient and convey pellet-like items in machines which receive, orient, convey and imprint pellet-like items with an intelligence or indicia.

BACKGROUND OF THE INVENTION

In the manufacture of many pharmaceutical products such as pills or lozenges, candies such as "M&M's", small mechanical parts such as ball bearings or electrical components such as resistors or capacitors, it is often desirable to imprint a trademark, indicia or other information or intelligence on each item. These products share a common characteristic in that they are all pellet-like items, being small, often round or rounded, oval, bulbous, cylindrical or polygonal in shape. Examples of pellet-like items are pills, lozenges, capsules, tablets and caplets.

Imprinting indicia on a series of pellet-like items is conveniently accomplished by a machine which receives a large number of items in bulk, typically from a feed hopper or bin, orients the items to a uniform relative orientation, conveys the oriented items to a printing unit wherein the indicia are applied to each item and discharges the items for subsequent packaging. U.S. Pat. No. 2,859,689 to Ackley is a typical example of a pellet marking machine which performs the steps outlined above. Pellet-like items, designated "P" in FIG. 2 of the '689 patent, are loaded in bulk into the feed hopper 22 where the items are received by a rotating drum or cylinder roll 23. The drum has a multiplicity of concavities or recesses 33 in its outwardly facing surface formed in accordance with the shape and size of the pellet-like items being processed. The items P are received into the concavities 33 as the drum rotates clockwise beneath hopper 22, retained in the concavities by cylindrical retainer surface 50 as the drum rotates and released to an endless conveyor 24 located beneath the drum, the conveyor having a multiplicity of individual carrier bars 110. Carrier bars 110 have corresponding concavities matching the concavities 33 in drum 23, and conveyor 24 is synchronized with drum 23 so that the matching concavities on the drum and the conveyor line up as the drum rotates clockwise and the conveyor circulates counterclockwise. Items P drop from concavities 33 in drum 23 into the matching concavities in the endless conveyor 24 once the items are clear of retaining surface 50. The pellet-like items P are then conveyed to a printing roller 27 which has ink laden images of the indicia or intelligence to be imprinted on the items circumferentially arrayed on its peripheral surface. Printing roller 27 rotates clockwise in synchronization with endless conveyor 24 and contacts the pellet-like items P as they pass beneath the printing roller 27, applying the ink laden image to each pellet-like item. After passing beneath printing roller 27, the pellet-like items P are discharged from conveyor 24 as the conveyor rounds its drive sprocket and the carrier bars 110 are momentarily vertically oriented.

Although pellet marking machines similar to that described in the '689 patent provide an effective means for reliably and rapidly marking pellet-like items with indicia, the machines are expensive and lack versatility, largely due to the design of rotating drum 23.

The drums are expensive because they are typically manufactured from a single custom made centrifugal casting which can weigh in excess of 350 lbs. This monolithic design has traditionally been thought necessary for drum manufacture in order to create a shell structure with a precision made, continuous outer surface which simultaneously allows access to the back surface of the shell for the mounting of auxiliary systems, such as vacuum assist systems to retain the pellet-like items to the drum as they are received from the hopper. The concavities are machined into the casting's curved outer surface, and machining such a heavy, monolithic piece is complicated, expensive, time consuming and risky. Complications arise because it is inherently more difficult to perform precision machining on a curved surface as compared with a flat surface, for example. The machining process is more expensive because often special tooling or jigs must be designed and fabricated to hold the heavy, bulky drum within the milling machine. The process is time consuming because of the typically large number of concavities which must be machined into a drum surface, requiring the drum to be constantly repositioned by the machinist on the milling machine so that the milling tool can have access to a tangent region on the drum surface. The process is risky because a single machining error can render the entire casting useless, perhaps negating many man-hours of machining effort, wasting thousands of dollars in material costs, as well as having an adverse impact on the production schedule for the machine.

In the recent past, pellet marking machine versatility was not a concern because there were a relatively limited number of pellet shapes and sizes in the marketplace and manufacturers by and large were satisfied with a dedicated machine for a particular product line. However, as the various industries, most notably pharmaceuticals, evolved over time, pellet marking machine versatility became more important. To remain competitive in the marketplace, pellet marking machines have been forced to evolve to keep up with the faster pace of technological change in product development, encapsulation methods, marking methods and packaging requirements, in addition to meeting the needs for greater efficiency and lower cost imposed by the highly competitive markets. In this context, pellet marking machine versatility, as evidenced by the ability to process different types of pellet-like items, has come to the fore as the desirable characteristic which makes one pellet marking machine superior to another among the various industrial customers.

The pellet marking machines of the past lack versatility because a monolithic drum can only have one type of concavity with a predetermined size and shape machined into its outer surface. The concavities in the monolithic drum must be specifically matched in size and shape to the particular pellet-like item being processed. Matching the concavity to the item is important for efficient processing of the items by the machine. Items which are poorly matched to their receiving concavities will not be efficiently received from the hopper, reducing the efficiency and item throughput of the machine as some concavities will fail to pick up an item as they pass beneath the hopper. The empty concavities have no item to transfer to the conveyor as the drum rotates through its cycle, resulting in an empty conveyor cavity passing beneath the printing rollers. Items which are received into concavities on the drum but which are not consistently positioned and reliably held due to shape or size mismatch between the items and the concavities will not be reliably and consistently transferred to the conveyor. Items not positioned precisely on the conveyor will not be correctly imprinted when the items pass beneath the printing roller, resulting in an unacceptable product and costly wastage. Some products may not make it to the printing roller at all and could even end up rolling loose on the conveyor, falling from the conveyor onto the factory floor or into the machine and fouling its moving parts.

Thus, if it is desired to process more than one type of pellet-like article with the same machine, a separate monolithic drum must be made to match to each type of item. Due to the size and weight of the monolithic drum and its position within the machine, a significant part of the machine must be disassembled to effect the change over to the new drum. The change over can require significant manpower as it is difficult for one person to safely handle a heavy drum and can further entail significant machine down time, adversely affecting item production rates and schedules. Furthermore, if a monolithic drum becomes damaged, it cannot be readily repaired in situ. Repair will typically require extensive machine down time to disassemble the machine and remove the drum for repair or replacement. Clearly, there is a need for an improved drum design in pellet marking machines which will increase versatility and efficiency of the machines while reducing the cost and risks associated with machine manufacture.

SUMMARY AND OBJECTS OF THE INVENTION

The invention provides a solution to the inherent problems of drum design outlined above by replacing the monolithic drum with a preferred embodiment of a quick change drum according to the invention comprising a central shaft to which two end plates are attached, one plate mounted at each end of the shaft, the plates being substantially perpendicular to the longitudinal shaft axis. The ends of the shaft extend outwardly from the end plates and provide a means to rotatably mount the quick change drum in a pellet marking machine as, for example, in journal bearings. Preferably the end plates are substantially round in shape, although other shapes are conceivable depending upon the specific application to which the drum is to be applied. The plates could be solid or lightening holes of various shapes and sizes could be provided in the plates. It is also preferred to attach the shaft to the center of the plates, although it may be desirable to eccentrically mount the plates to the shaft.

The end plates are separated in a parallel spaced apart relationship and multiple carrier bars are demountably attached to the end plates, spanning the space between the end plates and forming a substantially continuous generally cylindrical shell encircling the shaft and end plates. The carrier bars are attached to the end plates at a common radius, for example, at the periphery, although other configurations, such as attaching the bars inboard of the end plate periphery or at different radii forming a tapered drum, are conceivable. In order to better accommodate the carrier bars on the periphery of the end plates, it is preferable to machine a multiplicity of flat surface segments in the periphery of the end plates, the length of each segment being equal to the width of a carrier bar.

The carrier bars are demountably attached to the end plates, the preferred embodiment being to bolt the carrier bars to the end plates to ensure a rigid structure. However, it is sometimes possible to use quick connect/disconnect devices to effect the attachment of the carrier bars, as will be explained later in detail. Each carrier bar has one or more concavities machined in the outwardly facing surface, the concavities matched in size and shape to a particular pellet-like item to be processed.

As described previously, the ends of the central shaft preferably extend beyond the end plates of the quick change drum, allowing it to be mounted in rotational bearings within a pellet marking machine (such as the machine described in the '689 patent) in place of the monolithic drum. Although the preferred embodiment of the quick change drum uses a central shaft for superior strength and rigidity, a practical quick change drum could also be made without the shaft. In this alternative embodiment the carrier bars mounted between the end plates provide the transverse support and rigidity to the drum structure. Each end plate is provided with a trunnion or stump extending outwardly and perpendicularly from the plate. The trunnions are colinearly aligned along the axis of rotation of the drum and provide the means to rotatably mount the drum in a pellet marking machine.

The construction of the quick change drum from individual, readily assemblable and disassemblable components and especially the use of a multiplicity of individual carrier bars to form the outer shell of the quick change drum provides a tremendous advantage in versatility, efficiency, risk reduction and expense over the monolithic drum.

The quick change drum is less expensive because it can be manufactured from standard metal plate and bar stock, not a custom centrifugal casting as the monolithic drum requires, thus reducing material costs. Machining complexity is reduced as well because there is no need to handle a large, unwieldy casting and machine the concavities in a curved surface on the casting. The machinist works with simple parts which require no special tooling or fixturing.

Manufacture of a quick change drum entails less risk in machining because the concavities in the drum outer surface are machined in the carrier bars individually before the bars are mounted on the end plates. Thus, a machining mistake results only in the scrapping of one carrier bar, not the entire drum casting, as can happen in the monolithic design.

Manufacture of a quick change drum is more efficient because the need for a drum casting is eliminated. Castings typically are custom-designed components requiring a long lead time which often cause bottlenecks, slowing or halting machine production. Machines using a quick change drum can also be repaired more efficiently if the drum is damaged. Damaged carrier bars can be quickly changed by one person without disassembling the machine and replacing the entire drum, resulting in lower manpower requirements for machine repair and maintenance and decreased machine down time, yielding a higher production rate for each machine and an overall increase in production efficiency.

Probably the most important advantage provided by the quick change drum is the increase in versatility of the machine, enabling one machine to easily handle a wide spectrum of different pellet-like items. In distinct contrast, a pellet marking machine with a monolithic drum is essentially a dedicated machine, handling only one type of pellet-like item. To switch such a machine over to a different item requires an entirely new drum, disassembly of the machine and significant machine downtime while the change over is effected. These difficulties severely inhibit the use of machines with monolithic drums for processing more than one type of pellet-like item. With a quick change drum constructed from a shaft, end plates and individual carrier bars, however, the drum can be converted for use with different pellet-like items rapidly and easily by one person. Drum conversion merely requires replacing the carrier bars on the quick change drum with alternate carrier bars designed for the different shaped or sized item. The use of a quick connect/disconnect device to attach the carrier bars to the end plates, when feasible, enables even faster, more efficient change over of the drum.

Quick connect/disconnect devices for attachment of the carrier bars to the end plates of the quick change drum could take any number of forms but preferably would be like the devices described in co-pending application entitled QUICK CONNECT/DISCONNECT DEVICE, application Ser. No. 08/787,468, assigned to the same assignee as is the present application, herein incorporated by reference. The quick connect/disconnect device has a shank or body portion which interfits within mounting apertures in the carrier bars and radially oriented receiving holes typically arrayed around the circumference of the end plates. The quick connect/disconnect devices have two retaining means disposed at either end, one fixed retaining means for limiting the travel of the shank into the carrier bar mounting aperture, the other retaining means being retractable and limiting the movement of the shank within the receiving hole. When the carrier bar is mounted on the end plate and the mounting aperture is aligned with the receiving aperture, the quick connect/disconnect device is inserted, the retractable retaining means is extended and the carrier bar is sandwiched between the fixed retaining means and the periphery of the end plate. The retractable retaining means holds the quick connect/disconnect device within the end plate receiving hole by impinging or bearing on a surface within the hole, such as an undercut shoulder or annular groove. The quick connect/disconnect device has a manually operable means for retracting the retractable retaining means and withdrawing the retractable retaining means from impinging contact with the surface, thus allowing the device to be removed from the end plate receiving hole and, thereby, also permitting removal of the carrier bar from the end plate. A technician can thus easily and rapidly change carrier bars on the quick change drum by manually retracting the retractable retaining means, removing the carrier bar from the drum, removing the quick connect/disconnect device from the carrier bar mounting aperture, mounting a different carrier bar on the drum in place of the old carrier bar, inserting the quick connect/disconnect device through the new carrier bar mounting aperture and into the end plate receiving hole and manually extending the retractable retaining means to lock the replacement carrier bar into position.

It is an object of the invention to provide a drum which can be efficiently and easily converted for use with different pellet-like items, thereby increasing the versatility of pellet marking machines.

It is an object of the invention to provide a drum which is less expensive, simpler and more efficient to manufacture than existing drum designs.

It is another object of the invention to provide a drum which can be easily repaired.

It is a further object of the invention to provide a drum which is lighter in weight than drums as currently manufactured and which is made up by assembly of a multiplicity of pieces, each one of which weighs but a small fraction of the weight of the whole assembly.

These and other objects will become apparent from a consideration of the following drawings and detailed description.

DETAILED DESCRIPTION OF THE PREFERRED EMBODIMENT OF THE INVENTION

Figure 1:
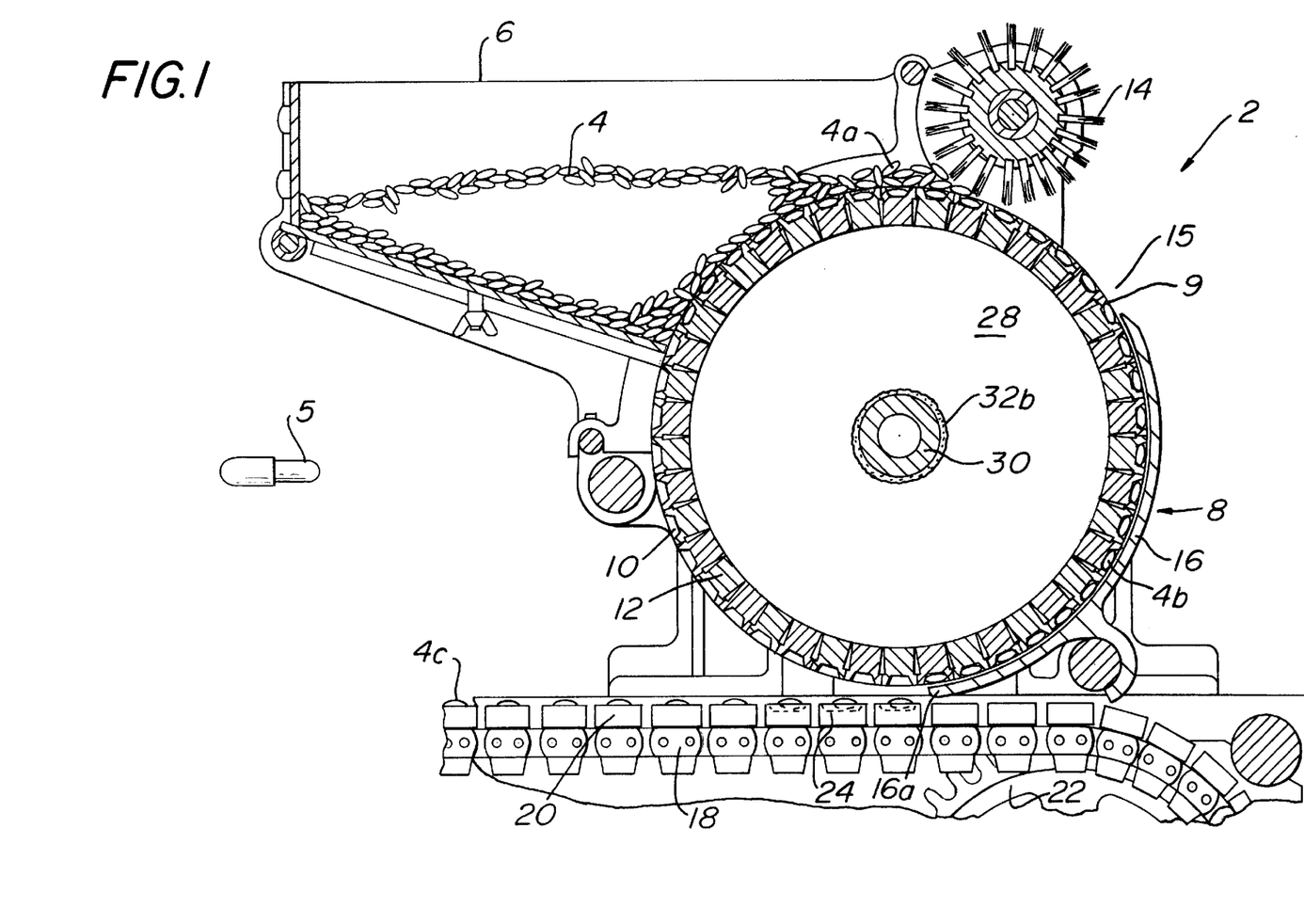
FIG. 1 is a cross-sectional view of a quick change drum shown mounted in a pellet marking machine between a hopper holding pellet-like items and a conveyor on an endless chain.
Figure 2:
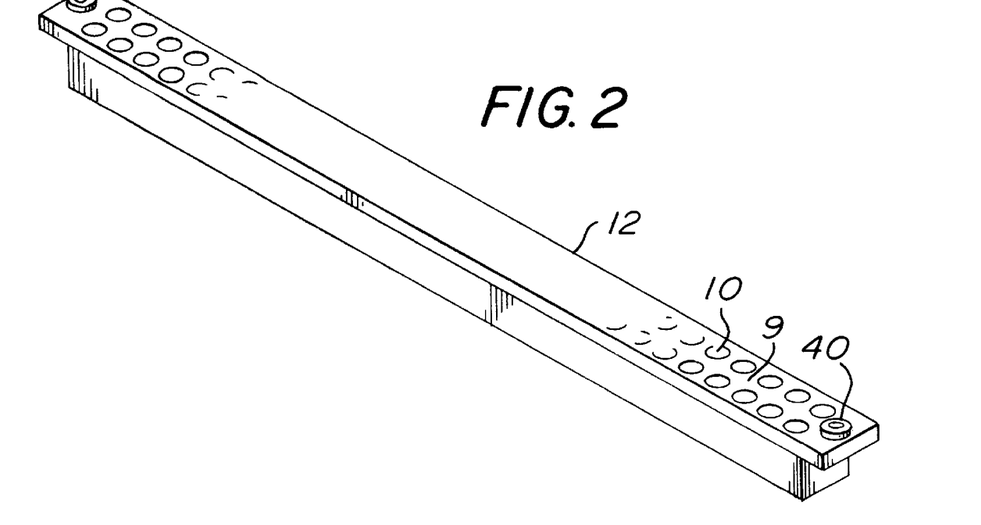
FIG. 2 is an isometric view of an individual carrier bar used in a quick change drum having concavities for receiving pellet-like items from a hopper and using a quick connect/disconnect device for attachment to a drum.

FIG. 1 shows a partial cross sectional view of a pellet marking machine 2 wherein pellet-like items 4 are loaded in bulk into a hopper 6 and received by a quick change drum 8 as it rotates clockwise beneath hopper 6. Pellet-like items 4 are received into concavities 10 formed in the outwardly facing surface 9 of carrier bars 12, shown to best advantage in FIG. 2. A brush 14 rotates counterclockwise and sweeps pellet-like items 4a which are not properly received in concavities 10 back into hopper 6. Pellet-like items properly positioned and oriented on drum 8, as indicated at 4b, are held within cavities 10 by the arcuate surface 16 as drum 8 rotates.

An endless chain conveyor 18 mounting conveyor carrier bars 20 is driven by sprocket 22 in a counterclockwise circuit. Chain 18 is synchronized with drum 8 to present a conveyor carrier bar 20 to each carrier bar 12 as the carrier bar 12 clears the end of arcuate surface 16, shown at 16a. Pellet-like items 4b drop from concavities 10 in carrier bars 12 once clear of the arcuate surface at 16a and fall into aligned concavities 24 in conveyor carrier bars 20, as seen at the "6 o'clock" position of drum 8 in FIG. 1. Pellet-like items as indicated at 4c are transported on the chain conveyor to a downstream pellet marking station, not shown, and then discharged from the machine.

Figure 3:
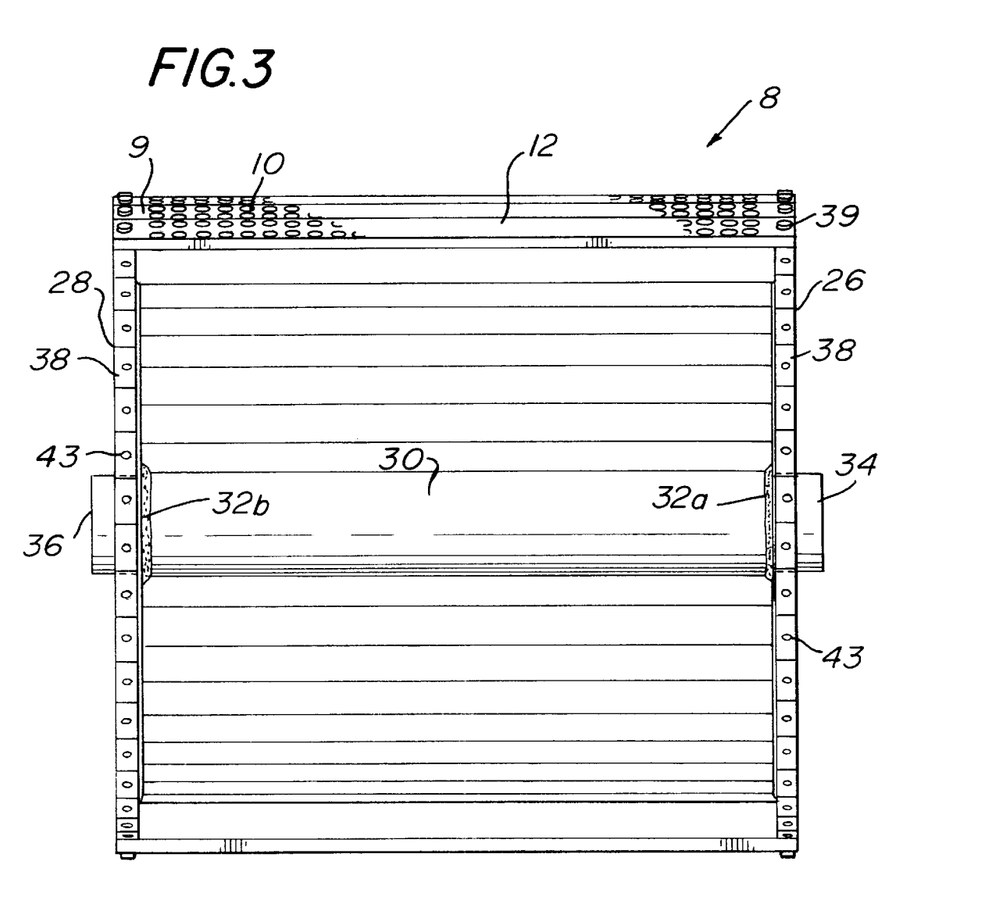
FIG. 3 is a side view of a quick change drum with some carrier bars removed to show the drum structure of end plates and central shaft.

Quick change drum 8 comprises two end members arranged in a parallel, spaced apart relationship and shown as end plates 26 and 28 in FIG. 3. Although the end plates are shown as solid, round plates, they could be virtually any shape and need not necessarily be solid. For example, lightening holes could be cut in the end plates removing significant material and providing a spoked wheel appearance.

As further illustrated in FIG. 3, an elongated shaft 30 is centrally attached to the end plates, for example, by fillet welds 32a and 32b. Ends of the shaft 30 extend beyond plates 26 and 28 forming trunnions 34 and 36 which provide a means for rotationally mounting drum 8 in a pellet marking machine. Trunnions 34 and 36 extend perpendicularly from the centers of end plates 26 and 28 and are aligned colinearly along the axis of rotation of drum 8. In an alternate embodiment of drum 8 shown in FIG. 7, elongated shaft 30 is eliminated and trunnions 34 and 36 extend perpendicularly from the centers of plates 26 and 28 to provide a mounting means for rotatably mounting the drum in a pellet marking machine. Trunnions 34 and 36 are aligned colinearly along the axis of rotation of drum 8.

Figure 7:
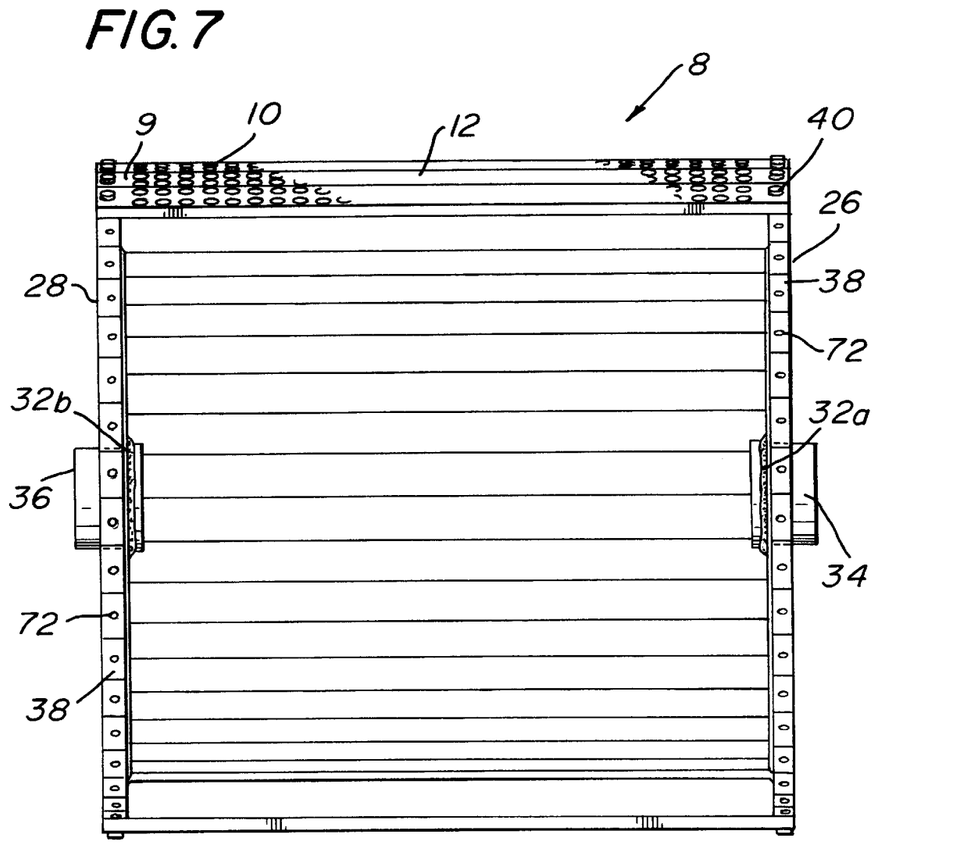
FIG. 7 is a side view of an alternate embodiment of a quick change drum lacking a central shaft with some of the carrier bars removed to show two trunnions attached to the end plates for rotationally mounting the quick change drum.

Carrier bars 12, a multiplicity thereof being provided, are demountably attached to end plates 26 and 28 at a common radius at the plates' periphery, and carrier bars 12 span the space between the end plates as seen in both FIGS. 3 and 7. In the drum embodiment shown in FIG. 7 the carrier bars 12 form the supporting structure of the drum and provide transverse support and rigidity otherwise provided by elongated shaft 30 in the preferred drum embodiment shown in FIG. 3. As mentioned above the carrier bars 12 have an outwardly facing surface 9 in which the concavities 10 for receiving the pellet-like items 4 are arranged, and the carrier bars are disposed on the drum in a closely spaced relationship, as seen in FIGS. 3 and 5, so that the surfaces 9 on each carrier bar 12 form a substantially continuous outwardly facing cylindrical surface. To ensure positive mounting of carrier bars 12 onto end plates 26 and 28 the peripheries of end plates 26 and 28 are provided with a multiplicity of flats 38, best illustrated in FIG. 4. The length of each flat 38 corresponds to the width of a carrier bar 12 and provides each carrier bar with a mating landing on the periphery of the end plates 26 and 28 which ensures a solid attachment of carrier bar to end plate, eliminating the tendency of a carrier bar to rock out of radial alignment, as might happen if the periphery of the end plates were perfectly round. Flats 38 thus help ensure accurate alignment of the carrier bars on the drum, eliminating a potential source of vibration which is important to the smooth operation of a fast running machine having tight tolerances and clearances between moving parts. Good radial alignment will also ensure that pellet-like items 4 are efficiently received from hopper 6, transported beneath arcuate surface 16 and reliably transferred to concavities 24 in conveyor carrier bars 20 mounted on endless chain conveyor 18. If the attachment of the carrier bars 12 to the end plates 26 and 28 were sloppy, and the carrier bars were allowed to rock out of radial alignment pellet-like items 4 might contact the leading edge of arcuate surface 16 at the "2 o'clock" position on the drum, damaging the pellet-like items. Worse still, the carrier bars themselves could strike the arcuate surface leading edge causing damage or a machine stoppage.

Figure 4:
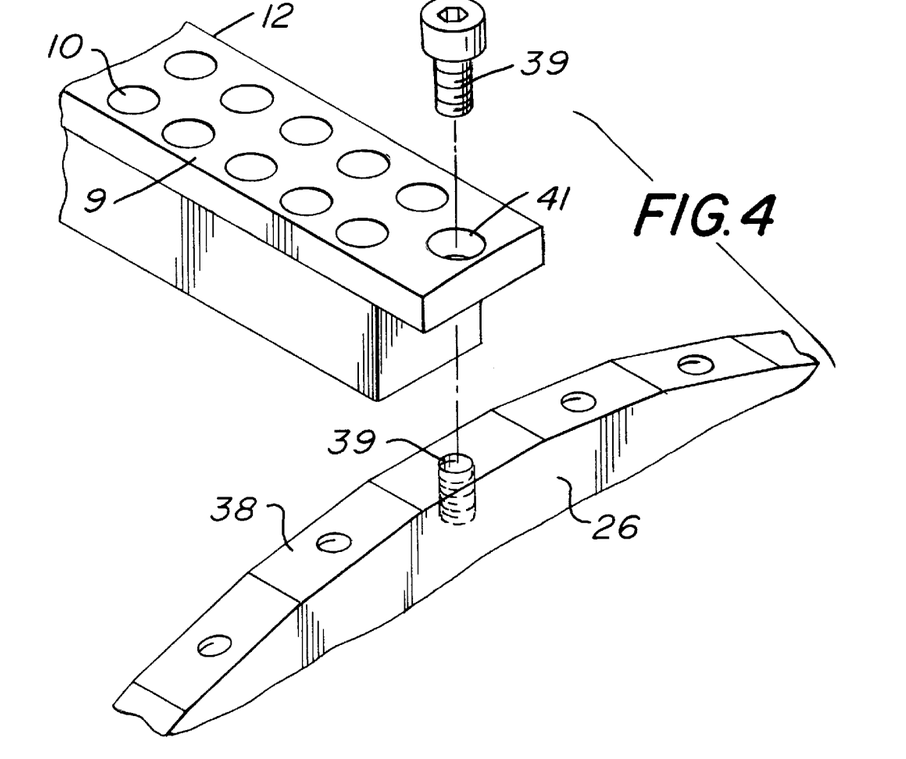
FIG. 4 is a detailed isometric exploded view of a carrier bar mounting on an end plate by means of a bolt.
Figure 5:
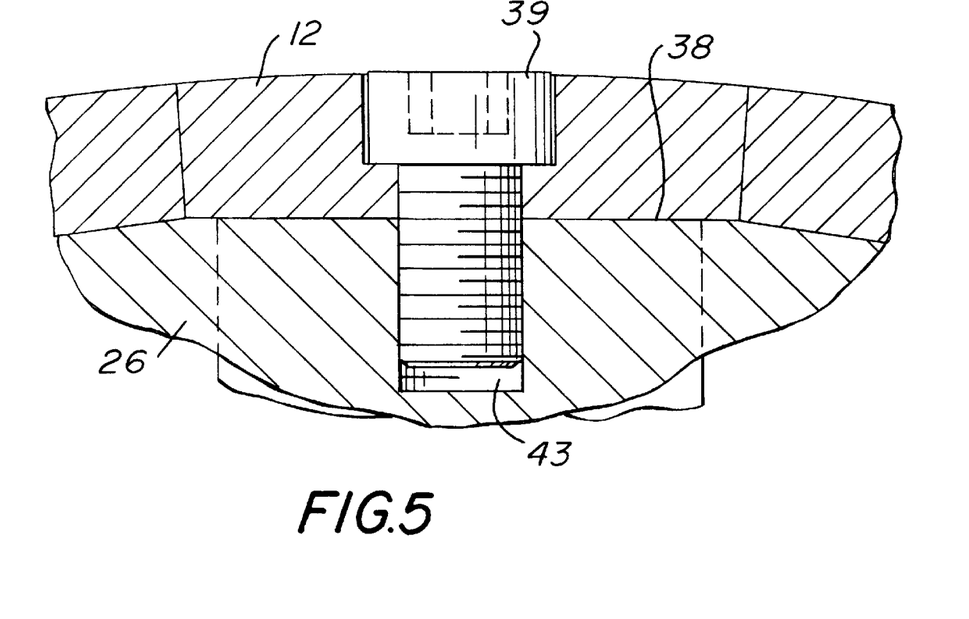
FIG. 5 is a detailed cross-sectional view of a carrier bar mounted on an end plate of a quick change drum by means of a bolt.

The preferred means of demountably attaching carrier bars 12 to end plates 26 and 28 is by means of bolts 39 passing through carrier bar mounting holes 41 and mating with threaded holes 43, as shown in FIGS. 4 and 5. Bolting the carrier bars to the end plates ensures a solid connection between carrier bar and end plate which reinforces the rigidity of the drum structure in both the preferred form of drum 8 having elongated shaft 30 as seen in FIG. 3, or the alternate embodiment without shaft 30, shown in FIG. 7. The rigidity provided by the bolted construction eliminates potential sources of vibration which can cause undesired wear on the drum components. The rigid structure also reduces deflection of the drum under load and thus helps maintain the close tolerances between moving parts necessary for efficient operation of the machine.

Figure 4A:
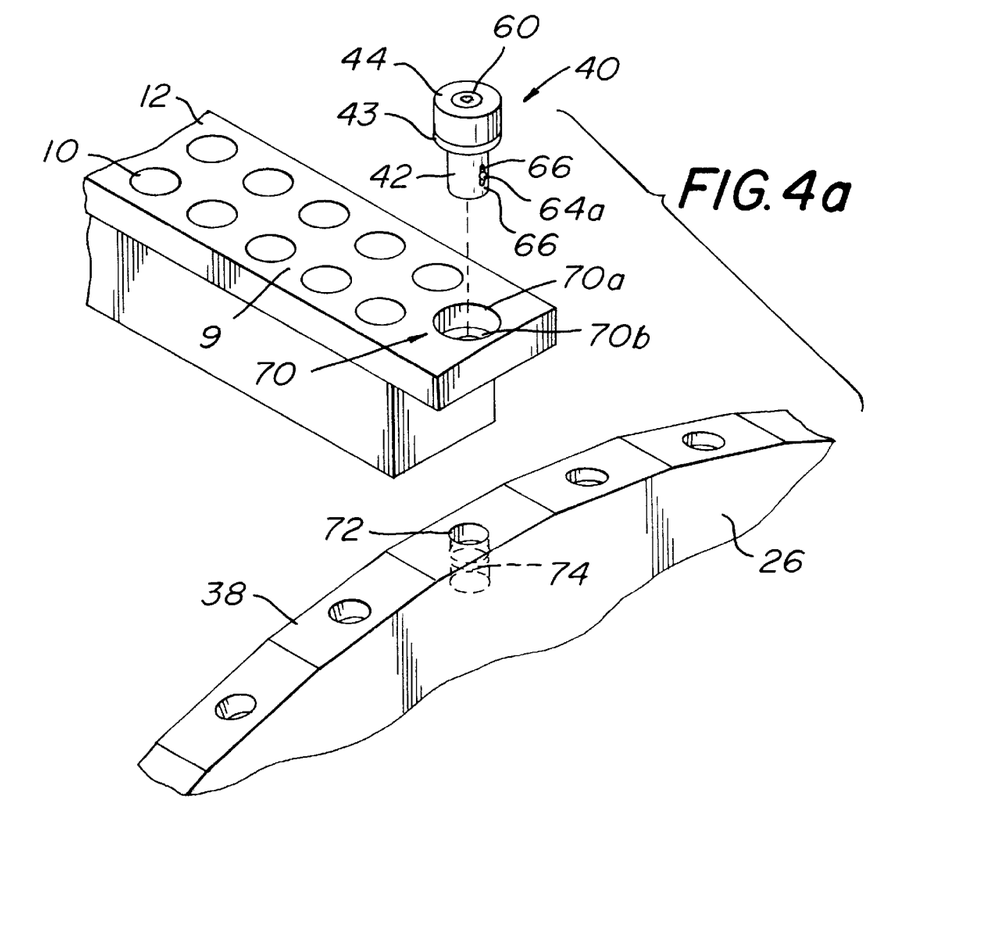
FIG. 4a is a detailed isometric exploded view of a carrier bar mounting on an end plate by means of a quick connect/disconnect device.
Figures 5A, 6:
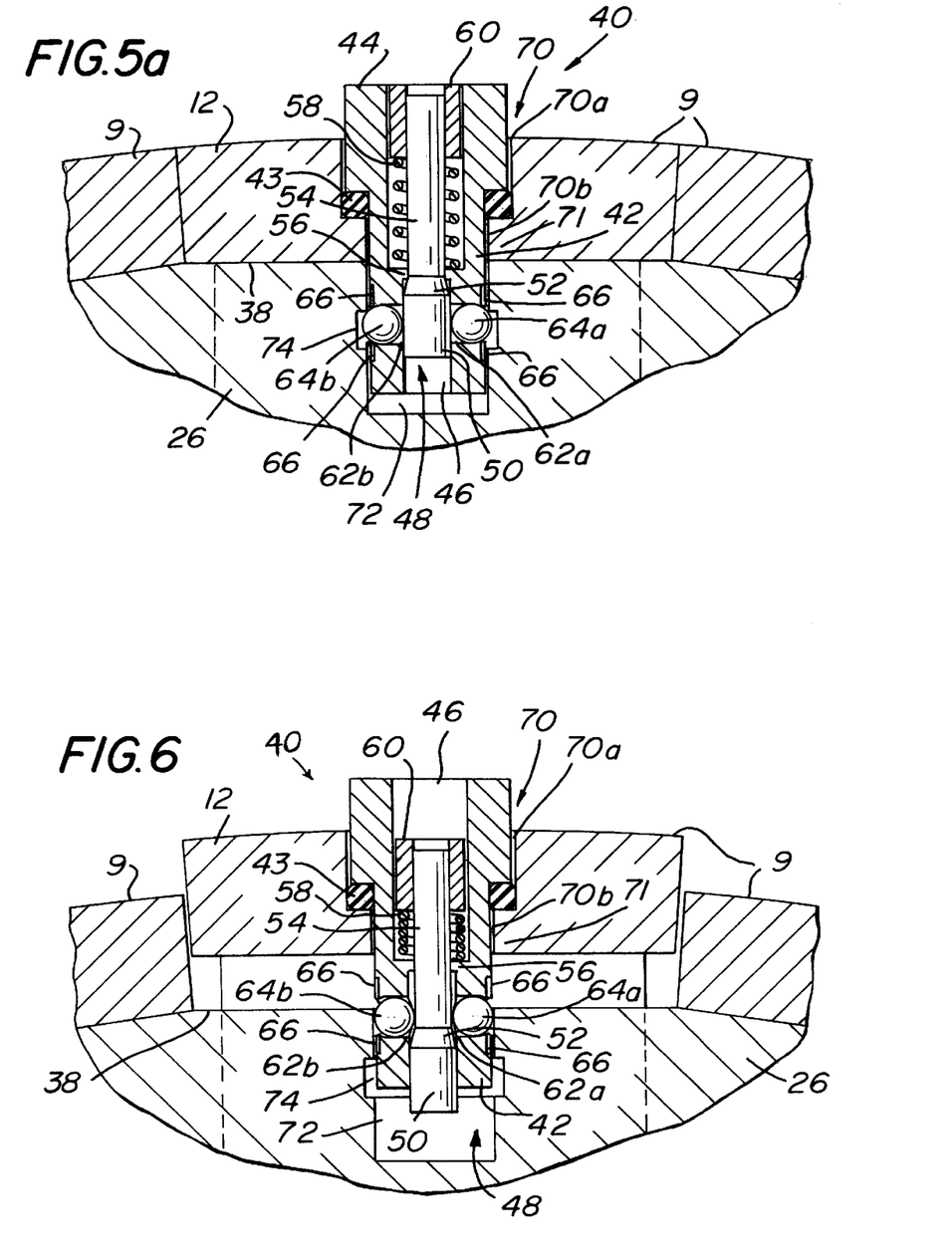
FIG. 5a is a detailed cross-sectional view of a carrier bar mounted on an end plate of a quick change drum by means of a quick connect/disconnect device.
FIG. 6 is a detailed cross-sectional view of a carrier bar being removed from an end plate of a quick change drum by means of a quick connect/disconnect device.

Carrier bars 12 may also be demountably attached to the end plates 26 and 28 by means of a quick connect/disconnect device 40, seen in FIGS. 4a, 5a and 6. Although device 40 does not provide the same degree of rigidity inherent in the bolted connection, use of the device 40 to attach carrier bars 12 to the end plates 26 and 28 provides an added advantage in time savings when carrier bars are changed, as described in more detail below. It is feasible to use the quick connect/disconnect device when the drum components are made of hard, wear-resistant materials such as steel alloys. Steel alloys are not as susceptible to friction induced wear due to vibration when compared with the softer aluminum alloys for example. Steel alloys are also significantly stiffer than aluminum alloys providing some compensation for the loss of rigidity encountered when the quick connect/disconnect device 40 is employed. Device 40 has a shank 42 and an enlarged head 44. An elastic O-ring 43 is disposed around shank 42 adjacent to enlarged head 44. O-ring 43 provides a preloading and biasing function, as will be explained later, and is the major source of flexibility when device 40 is used to attach the carrier bars to the end plates.

A central bore 46 extends longitudinally through both shank and head, as seen in FIG. 5a. Central bore 46 houses a plunger 48 which has a segment of larger diameter 50 whose diameter is slightly smaller than the central bore throughout the shank 42, a tapering segment 52 and a segment of smaller diameter 54, whose diameter is considerably smaller than the central bore 46. A shoulder 56 is undercut into the central bore 46 marking a reduction in diameter of the central bore approximately at the mid point of the shank 42.

Plunger 48 is arranged within central bore 46 with its smaller diameter segment 54 substantially adjacent to enlarged head 44 and the larger diameter segment 50 towards the end of shank 42 opposite head 44. Tapering segment 52 of plunger 48 is designed to seat against shoulder 56 and the shoulder thus prevents plunger 48 from passing entirely through central bore 46. A biasing spring 58 is disposed in the central bore 46 adjacent to the enlarged head 44 around smaller diameter segment 54 and spring 58 rests against shoulder 56. A plunger cap 60 having an outer diameter slightly smaller than the central bore 46 is attached to the end of smaller diameter segment 54 adjacent to head 44. Biasing spring 58 is trapped between shoulder 56 and plunger cap 60 and biases plunger 48 within the central bore 46 forcing tapering segment 52 to seat against shoulder 56 in the normal biased position shown in FIG. 5i a.

Quick connect/disconnect device 40 has at least one, but preferably two, passages 62a and 62b oriented radially near the end of shank 42 opposite head 44, as seen in FIGS. 5a and 6. Passages 62a and 62b communicate between the outer surface of shank 42 and the central bore 46. Each passage has a respective ball 64a and 64b contained therein. The diameters of balls 64a and 64b are slightly smaller than the diameters of their respective passages 62a and 62b allowing the balls to move freely into and out of the passages, however, the diameters of the balls 64a and 64b are slightly greater than the lengths of the respective passages 62a and 62b; thus, a portion of each ball must always project from the respective passage, either outwardly beyond shank 42, as seen in FIG. 5a, or inwardly into central bore 46, as seen in FIG. 6.

Since the balls 64a and 64b are slightly smaller in diameter than passages 62a and 62b the passages must be staked at the outer surface of shank 42, as shown by distortions 66 in FIGS. 4a, 5a and 6, in order to retain the balls within the passages.

Staking is a means of retaining something in an aperture or passage by impaling the exposed end of the passage with a punch to permanently distort the shape of the passage locally. Local distortions 66 narrow the ends of passages 62a and 62b. The distortions 66 impinge on the ball surface thereby preventing the balls from freely rolling out of the passage while allowing a portion of each ball to extend beyond the shank surface, as seen in FIG. 5a.

Biasing spring 58 normally biases plunger 48 to the position within central bore 46 shown in FIG. 5a wherein tapering segment 52 seats against shoulder 56. This normal biased position places the larger diameter segment 50 of plunger 48 adjacent to passages 62a and 62b. Because the larger diameter segment 50 substantially fills the central bore 46, balls 64a and 64b are displaced from the central bore 46 and forced against the staking distortions 66 at the ends of passages 62a and 62b, the balls 64a and 64b projecting beyond shank 42.

In this normal biased position tapering segment 52 of plunger 48 is held fast against shoulder 56 by the action of biasing spring 58. When plunger 48 is moved within central bore 46 by manually depressing plunger cap 60, biasing spring 58 is compressed between plunger cap 60 and shoulder 56 and the smaller diameter segment 54 of plunger 48 moves to a position adjacent to passages 62a and 62b, as seen in FIG. 6. Smaller diameter segment 54 is dimensioned to allow balls 64a and 64b to project partially into central bore 46 but still remain substantially within passages 62a and 62b respectively.

When balls 64a and 64b project into central bore 46, they retract into the passages 62a and 62b and no longer project beyond shank 42, as shown in FIG. 6. When pressure is released on plunger cap 60, biasing spring 58 moves plunger 48 back to its normal biased position. Tapering segment 52 of plunger 48 engages balls 64a and 64b which are projecting into central bore 46 forcing the balls into their respective passages 62a and 62b. As plunger 48 continues to move under the action of biasing spring 58, larger diameter segment 50 contacts balls 64a and 64b forcing the balls completely out of central bore 46 and into passages 62a and 62b, the motion of the balls being halted by the staking distortions 66, the balls being trapped between the larger diameter segment 50 and the staking distortions 66, the balls partially projecting beyond shank 42.

FIGS. 4a and 5a illustrate how quick connect/disconnect device 40 is used to demountably attach the carrier bars to the end plates on the quick change drum. Attachment is illustrated for one carrier bar 12 to one end plate 26, although it is to be understood that the method of attachment is identical for all carrier bars on both end plates 26 and 28.

Device 40 interfits within a mounting aperture 70 in the end of carrier bar 12. Mounting aperture 70 has a cylindrical countersink 70a having a relatively large diameter and a smaller diameter pilot aperture 70b, counter sink and pilot aperture together forming a shoulder 71 in carrier bar 12. Countersink 70a receives the enlarged head 44 of the device and pilot aperture 70b receives shank 42. Enlarged head 44 of device 40 limits the travel of device 40 through the carrier bar mounting aperture 70 by forcing O-ring 43 against shoulder 71 as seen in FIG. 5a. O-ring 43 is slightly oversized compared with the diameter of countersink 70a, thus impinging elastically against countersink 70a and holding device 40 within mounting aperture 70.

Carrier bar 12 sits on a flat 38 on the periphery of end plate 26 as shown in FIG. 5a, and shank 42 of device 40 further engages a receiving aperture 72 radially disposed in the periphery of plate 26 and aligned with mounting aperture 70. (There is one flat 38 and one receiving hole 72 in each end plate 26 and 28 for each carrier bar 12 of the multiplicity of carrier bars to be mounted on the quick change drum 8.) As seen in FIG. 4 and in greater detail in FIG. 5a, receiving aperture 72 has an annular groove 74 disposed at a predetermined depth within the receiving aperture 72. Annular groove 74 forms a pocket which receives balls 64a and 64b when shank 42 interfits within receiving aperture 72 and balls 64a and 64b project from shank 42, as seen in FIG. 5a. Shoulder 71 of carrier bar 12 is thus sandwiched between enlarged head 44, O-ring 43 and flat 38, and balls 64a and 64b extend beyond shank 42 into annular groove 74 where the balls impinge on the groove in receiving aperture 72 and retain device 40 to end plate 26, thereby retaining carrier bar 12 to end plate 26.

O-ring 43 is provided on shank 42 adjacent to enlarged head 44 to provide an elastic preloading to device 40. The thickness of O-ring 43 is coordinated with the position of passages 62a and 62b in shank 42 and the depth of annular groove 74 in the end plate 26 such that the O-ring must be compressed between enlarged head 44 and shoulder 71 of carrier bar 12 in order for passages 62a and 62b to align with annular groove 74 such that balls 64a and 64b can be displaced into passages 62a and 62b by larger diameter segment 50 of plunger 48 and thereby extend fully beyond shank 42 into annular groove 74. The preload of O-ring 43 exerts an upward biasing force on device 40 forcing balls 64a and 64b to seat against the upper edge of annular groove 74, shown in FIG. 5a. The biasing force holds carrier bar 12 relatively tightly against flat 38 and prevents unwanted relative motion between the carrier bar and the end plate. The preload helps reduce the potential for unwanted vibration during rotation of quick change drum 8 and allows the drum to be integrated into a pellet marking machine 2 having moving parts with relatively tight tolerances. Without an elastic preload means, it is possible that carrier bars could come loose with wear and rattle on the drum or strike other parts of the machine during drum rotation, such as the leading edge of arcuate surface 16. Close tolerances are also held between the diameter of shank 42, pilot aperture 70b and receiving aperture 72. Close tolerances between these mating components ensure that carrier bars 12 will be precisely aligned on the drum 8 to reliably receive, transport and transfer pellet-like items 4 from hopper 6 to conveyor carrier bars 20 on endless chain conveyor 18 as illustrated in FIG. 1.

The advantage of the quick change drum can be demonstrated by describing the process by which a drum in a pellet marking machine may be converted to handle different types of pellet-like items. In a pellet marking machine as shown in FIG. 1 concavities 10 in carrier bars 12 on drum 8 are matched in size and shape to efficiently receive pellet-like items 4 from hopper 6 and transfer them to conveyor carrier bars 20 which transport items 4 to the pellet marking station (not shown) and then discharge the items from the machine for further processing. As stated previously, it is important that concavities 10 be matched with pellet-like items 4 to ensure efficient and reliable operation of the machine yielding a high product throughput with a minimum of product wastage. When the production run for pellet-like items 4 is complete, machine 2 can be easily converted to process a different pellet-like item such as capsule 5 shown in FIG. 1. To effect the conversion of drum 8 from processing pellet-like items 4 to pellet-like items 5 a technician replaces each carrier bar 12 on drum 8 with a carrier bar suited to the new item 5 by the following procedure.

Access to carrier bars 12 is afforded at open region 15 disposed between brush 14 and arcuate surface 16 as seen in FIG. 1. If the carrier bar 12 is bolted to end plates 26 and 28, a technician uses a wrench or other suitable tool to unbolt bolts 39 (see FIG. 4) on a conveniently exposed carrier bar and then manually removes the unbolted bar from the end plates 26 and 28. The technician then positions the replacement carrier bar on the exposed flats 38 on end plates 26 and 28, aligning carrier bar mounting holes 41 with threaded holes 43 in end plates 26 and 28. Bolts 39 are then inserted into mounting holes 41 and further into threaded holes 43 whereupon the bolts are tightened to rigidly attach the replacement carrier bar to the end plates. This procedure is repeated for each carrier bar until all carrier bars comprising the drum have been replaced. The drum must be advanced periodically to expose carrier bars to the technician at region 15 allowing their convenient removal and replacement.

If the carrier bars 12 are mounted to end plates 26 and 28 by means of the quick connect/disconnect device 40, the technician again accesses the carrier bars at region 15.

Using an awl or similar tool the technician chooses a particular carrier bar 12 and depresses plunger cap 60 in the quick connect/disconnect device 40 attaching the chosen carrier bar to end plate 26. As shown in FIGS. 5a and 6, depressing plunger cap 60 moves plunger 48 against biasing spring 58, compressing the spring between plunger cap 60 and central bore shoulder 56. As plunger 48 moves downwardly within central bore 46 larger diameter plunger segment 50 moves out of alignment with passages 62a and 62b, and smaller diameter plunger segment 54 aligns adjacent to the passages. Balls 64a and 64b, previously displaced into passages 62a and 62b (seen in FIG. 5a) by the presence of larger diameter plunger segment 50, are permitted to retract into passages 62a and 62b and extend partially into central bore 46 against smaller diameter plunger segment 54 (seen in FIG. 6). Balls 64a and 64b are forced into this configuration by the elastic forces of O-ring 43 pushing against enlarged head 44 and raising device 40 upwardly relative to the carrier bar and the end plate 26.

The upper edge of annular groove 74 in receiving aperture 72 impinges on the curved surface of balls 64a and 64b, forcing the balls inwardly once larger diameter plunger segment 50 is out of alignment with passages 62a and 62b. Once balls 64a and 64b are no longer extended and engaging annular groove 74, shank 42 may be freely withdrawn from receiving aperture 72 by lifting the carrier bar 12 from end plate 26, as shown in FIG. 6. Once the technician performs the same sequence of steps on the quick connect/disconnect device at the other end of the chosen carrier bar 12 to free the carrier bar from end plate 28, the carrier bar may be completely removed from drum 8.

When their use is feasible, it is preferred that each carrier bar have a dedicated pair of quick connect/disconnect devices which, although removable, are not generally removed from the carrier bar, but remain with the carrier bar when it is interchanged. Although using dedicated devices requires having at least a pair of quick connect/disconnect devices for each carrier bar, the use of dedicated devices reduces the potential for misplacing the quick connect/disconnect devices, and saves time by eliminating the need to transfer the quick connect/disconnect devices from one carrier bar to its replacement. For the sake of completeness, the following paragraph describes the use of non-dedicated devices which must be transferred to the replacement carrier bar which may then be mounted on the end plates, but it is to be understood that this step can be eliminated, and other advantages secured, if, as preferred, quick connect/disconnect devices remain with the carrier bars.

Next the quick connect/disconnect devices may be removed from the chosen carrier bar 12 and inserted into the replacement carrier bar which has concavities matched to the new pellet-like items 5. Once again, the technician depresses plunger cap 60 allowing balls 64a and 64b to retract into passages 62a and 62b and extend into central bore 46. Substantially simultaneously with depressing the plunger cap, the technician grips the exposed portion of enlarged head 44 and pulls device 40 upwardly relative to carrier bar 12. (If head 44 is flush with carrier bar 12, leaving no exposed portion to grip, the technician must push upwardly on the lower end of shank 42 instead.) The lower edge of shoulder 71 impinges on balls 64a and 64b forcing the balls into the passages 62a and 62b thereby allowing shank 42 to be freely withdrawn through pilot aperture 70b. Device 40 may now be used to attach the replacement carrier bar to drum 8.

The process of attaching the replacement carrier bar to the drum with the quick connect/disconnect device is essentially the reverse of the process described above to remove the old carrier bar. It should be understood that two quick connect/disconnect devices 40 are used to attach each replacement carrier bar to drum 8, so the following steps must be performed twice for each device, although the procedure will be described just once for only one device 40. It is further understood that the replacement carrier bar is substantially identical in structure with the old carrier bar, with the exception of the shape and size of the concavities. Thus, the same reference characters are used to describe the replacement carrier bar in the following procedure.

First, if a dedicated device is not used on the replacement carrier bar (as explained above), a quick connect/disconnect device 40 is inserted by the technician into the pilot aperture 70b of the replacement carrier bar. The shank 42 will not pass through the pilot aperture however because the balls 64a and 64b will be extended beyond the shank because biasing spring 58 keeps plunger 48 in its normally biased position wherein larger diameter segment 50 is aligned with passages 62a and 62b, effectively displacing balls 64a and 64b from central bore 46 fully into and extending from passages 62a and 62b. The technician depresses plunger cap 60, however, and moves plunger 48 against its biasing spring 58 bringing the smaller diameter plunger segment 54 into alignment with passages 62a and 62b.

The upper surface of shoulder 71 impinges on the extended curved surface of balls 64a and 64b. The balls being free to withdraw into the passages 62a and 62b and extend into the central bore 46 retract, and shank 42 passes freely into pilot aperture 70b. Once passages 62a and 62b are clear of the side wall of pilot aperture 70b, the technician releases the pressure on plunger cap 60 allowing the plunger to snap back to its normally biased position under the action of biasing spring 58 forcing balls 64a and 64b to extend outwardly beyond shank 42. The technician seats O-ring 43 against shoulder 71, and the O-ring is sandwiched between enlarged head 44 and the shoulder. A substantial portion of shank 42 projects downwardly from pilot aperture 70b. The replacement carrier bar is then positioned by the technician on the drum 8 spanning the space between the end plates 26 and 28. The technician positions the end of the replacement carrier bar next to an exposed flat 38 of end plate 26 and aligns mounting aperture 70 with receiving aperture 72. This aligns shank 42 with the receiving aperture 72, and the technician then engages shank 42 with receiving aperture 72. Shank 42 will not enter receiving aperture 72 however because balls 64a and 64b are extended outwardly and impinge on the sidewall of the receiving aperture. Again, by depressing plunger cap 60, the technician allows the balls to retract as the upper edge of receiving hole 72 impinges on balls 64a and 64b forcing them into passages 62a and 62b. With the balls retracted, shank 42 then passes into receiving aperture 72 and the carrier bar seats against flat 38.

However, the balls cannot re-extend outwardly from shank 42 until the passages 62a and 62b align with annular groove 74 in the receiving aperture 72. To force this alignment, the technician must apply pressure downwardly on enlarged head 44. This causes O-ring 43 to be compressed between head 44 and shoulder 71 as device 40 moves downwardly relatively to the replacement carrier bar and the end plate 26. Forcing device 40 downwardly brings passages 62a and 62b into alignment with the pocket formed by annular groove 74, and balls 64a and 64b are free to extend outwardly from shank 42 uninhibited by the side wall of receiving aperture 72.

The technician next releases plunger cap 60 which snaps to its normally biased position causing balls 64a and 64b to extend into the annular groove 74. The technician next releases the pressure on enlarged head 44. This allows the elastic O-ring to expand and relax somewhat, moving device 44 upwardly relative to the replacement carrier bar and end plate 26. The extended balls 64a and 64b are pulled snug against the upper edge of annular groove 74, as seen in FIG. 5a, and the replacement carrier bar is securely but demountably attached to the drum 8.

The procedures described above for removing and replacing carrier bars on drum 8 are repeated for each end of each carrier bar until all of the old carrier bars matched to pellet-like item 4 are replaced by replacement carrier bars matched to the new pellet-like item 5. It will be necessary for the technician to rotate drum 8 periodically to expose carrier bars for access at region 15 as the bars are replaced. Once all of the carrier bars are replaced the drum is then ready to process the new pellet-like items quickly and efficiently.

The carrier bar replacement process for drum conversion from one pellet-like item to another is easily accomplished by one technician with a minimum of tools in a short period of time. Unlike the monolithic drum design, the machine need not be disassembled and out of action for an extended period of time. Clearly, repairs to the drum can be made quickly by replacing soiled, worn or damaged carrier bars individually. Use of the quick connect/disconnect device, when feasible, acts as a multiplier on the efficiency of the conversion process, allowing even more rapid modification of the drum to handle different types of pellet-like items.

We claim:

1. In a device for receiving, orienting, conveying and imprinting an intelligence on a series of pellet-like items, a readily assemblable and disassemblable rotatable drum comprising:
    a first end member;
    a second end member arranged in a substantially parallel spaced apart relation to said first end member;
    a multiplicity of carrier bars spanning the space between said first and said second end members, each bar having an outwardly oriented face having at least one concavity for holding a pellet-like item, each bar being manually demountably attached to said first and said second end members; and
    means for rotatably mounting said drum.

2. A drum according to claim 1, wherein said end members are substantially round.

3. A drum according to claim 2, wherein said carrier bars mount on said first and second end members at a common radius.

4. A drum according to claim 3, wherein said common radius is the periphery of said end members.

5. A drum according to claim 1, wherein said end members are solid plates.

6. A drum according to claim 1, wherein said carrier bars are demountably attached to said first and second end members in a closely spaced relationship adjacent to each other forming a substantially continuous outwardly facing surface.

7. A drum according to claim 6 in which the carrier bars mount on the end plates against a series of flats provided in the peripheral surface of the end members.

8. A drum according to claim 1, wherein said carrier bars are demountably attached to said end members by means of bolts.

9. A drum according to claim 1, wherein said means for demountably attaching said carrier bars to said end members is by a quick connect/disconnect means.

10. A drum according to claim 1, wherein said means for rotatably mounting said drum comprises first and second trunnions extending respectively from said first and second end members, said trunnions being oriented substantially perpendicular to said end members and defining an axis of drum rotation, said trunnions being disposed colinearly along the rotational axis of said drum.

11. A drum according to claim 10, wherein said trunnions extend from the respective centers of said first and second end members.

12. A drum according to claim 1, wherein each carrier bar is provided with a multiplicity of like concavities for holding pellet-like items.

13. In a device for receiving, orienting, conveying and imprinting an intelligence on a series of pellet-like items, a readily assemblable and disassemblable rotatable drum comprising:
    an elongated shaft;
    a first end member centrally attached to said shaft and being oriented substantially perpendicular thereto;
    a second end member centrally attached to said shaft in a substantially parallel spaced apart relation to said first end member;
    a multiplicity of carrier bars spanning the space between said first and said second end members, each bar having an outwardly oriented face having at least one concavity for holding a pellet-like item, each bar being manually demountably attached to said first and said second end members; and
    means for rotatably mounting said drum.

14. A drum according to claim 13, wherein said end members are substantially round.

15. A drum according to claim 14, wherein said carrier bars mount on said first and second end members at a common radius.

16. A drum according to claim 15, wherein said common radius is the periphery of said end members.

17. A drum according to claim 13, wherein said end members are solid plates.

18. A drum according to claim 13, wherein said carrier bars are demountably attached to said first and second end members in a closely spaced relationship adjacent to each other forming a substantially continuous outwardly facing surface.

19. A drum according to claim 18 in which the carrier bars mount on the end members against a series of flats provided in the peripheral surface of the end members.

20. A drum according to claim 13, wherein said carrier bars are demountably attached to said end members by means of bolts.

21. A drum according to claim 13, wherein said means for demountably attaching said carrier bars to said end members comprises quick connect/disconnect means.

22. A drum according to claim 13, wherein said means for rotatably mounting said drum comprises first and second trunnions extending respectively from said first and second end members, said trunnions being oriented substantially perpendicular to said end members and defining an axis of drum rotation, said trunnions being disposed colinearly along the rotational axis of said drum.

23. A drum according to claim 22, wherein said trunnions extend from the respective centers of said first and second end members.

24. A drum according to claim 13, wherein each carrier bar is provided with a multiplicity of like concavities for holding pellet-like items.

25. In a device for receiving, orienting, conveying and imprinting an intelligence on a series of pellet-like items, a readily assemblable and disassemblable rotatable drum comprising:

an elongated shaft;

a first end plate having a perimeter, and a multiplicity of circumferentially spaced radially oriented holes disposed around said perimeter, said first end plate being attached to said shaft, said shaft being oriented substantially perpendicular to the plane of said first end plate;

a second end plate having a perimeter and a multiplicity of circumferentially spaced radially oriented holes disposed around said perimeter, said second end plate being attached to said shaft in a substantially parallel spaced apart relation to said first end plate;

a multiplicity of elongated carrier bars demountably attached to said perimeters of said first and second end plates, each carrier bar having an outwardly oriented face having at least one concavity for holding a pellet-like item, said carrier bars extending between said first and second end plates, said carrier bars each having at least two mounting holes, said mounting holes aligning with said radially oriented holes in said first and second end plates;

means for securing said carrier bars to said first and second end plates by engaging said mounting holes in said carrier bars and said radially oriented holes in said end plates; and means for rotatably mounting said drum.

26. A drum according to claim 25, wherein each of said radially oriented holes has threads and said means for securing said carrier bars to said first and second end plates comprises a multiplicity of bolts having bolt threads matched to said radially oriented hole threads, said bolt threads interengaging said hole threads and thereby securing said carrier bars to said end plates.

27. A drum according to claim 25, wherein an annular groove is disposed circumferentially within each of said radially oriented holes and said means for securing said carrier bars to said first and second end plates comprises a multiplicity of quick connect/disconnect devices, each quick connect/disconnect device comprising:

a shank portion having first and second ends, said first end interfitting within a radially oriented hole in one of said end plates, said second end projecting outwardly from said radially oriented hole and interfitting within a carrier bar mounting hole;

a retractable projection extending radially from said shank portion, said retractable projection being disposed adjacent to said first end of said shank portion and interengaging said annular groove thereby retaining said shank portion to said end plate;

an enlarged head mounted on said shank portion at said second end, said carrier bar being positioned along said shank portion between said head and said retractable projection, said head having a bearing surface being in bearing contact with the carrier bar adjacent to said mounting hole, said carrier bar being sandwiched between said head bearing surface and said end plate and retained against said end plate thereby; and a means for retracting said retractable projection disposed within said shank portion, actuation of said retracting means withdrawing said projection from interengagement with said annular groove and permitting said shank portion to be removed from said radially oriented hole in said end plate, thereby releasing said carrier bar from said end plate.

28. A drum according to claim 25, wherein said end plates are substantially round.

29. A drum according to claim 25, wherein said end plates are solid plates.

30. A drum according to claim 25, wherein said end plates attach to said shaft substantially at the respective centers of said end members.

31. A drum according to claim 25, wherein said carrier bars are demountably attached to said first and second end plates in a closely spaced relationship adjacent to each other forming a substantially continuous outwardly facing surface.

32. A drum according to claim 31 in which the carrier bars mount on said end plates against a series of flats provided in the periphery of said end plates.

33. A drum according to claim 25, wherein said means for rotatably mounting said drum comprises first and second trunnions extending respectively from said first and second end plates, said trunnions being oriented substantially perpendicular to said end plates and defining an axis of drum rotation, said trunnions being disposed colinearly along the rotational axis of said drum.

34. A drum according to claim 33, wherein said trunnions extend from the respective centers of said first and second end plates.

35. A drum according to claim 25, wherein each carrier bar is provided with a multiplicity of like concavities for holding pellet-like items.

\* \* \* \* \*